(12) United States Patent
Kim et al.

(10) Patent No.: US 12,083,919 B2
(45) Date of Patent: Sep. 10, 2024

(54) SYSTEMS AND METHODS FOR CHARGING ELECTRIC VEHICLES

(71) Applicants: Junkyeong Kim, Rancho Cucamonga, CA (US); Minjun Seo, Rancho Cucamonga, CA (US)

(72) Inventors: Junkyeong Kim, Rancho Cucamonga, CA (US); Minjun Seo, Rancho Cucamonga, CA (US)

(73) Assignee: MicroNOC, Inc., Rancho Cucamonga, CA (US)

( * ) Notice: Subject to any disclaimer, the term of this patent is extended or adjusted under 35 U.S.C. 154(b) by 527 days.

(21) Appl. No.: 17/521,837

(22) Filed: Nov. 8, 2021

(65) Prior Publication Data

US 2022/0111751 A1    Apr. 14, 2022

Related U.S. Application Data

(63) Continuation-in-part of application No. 16/576,762, filed on Sep. 19, 2019, now Pat. No. 11,177,661.

(51) Int. Cl.
| | |
|---|---|
| *B60L 53/63* | (2019.01) |
| *B60L 53/10* | (2019.01) |
| *B60L 53/30* | (2019.01) |
| *B60L 53/66* | (2019.01) |
| *G05B 15/02* | (2006.01) |

(52) U.S. Cl.
CPC ............. *B60L 53/63* (2019.02); *B60L 53/11* (2019.02); *B60L 53/305* (2019.02); *B60L 53/66* (2019.02); *B60L 2240/72* (2013.01); *G05B 15/02* (2013.01)

(58) Field of Classification Search
CPC .... B60L 2240/72; B60L 53/11; B60L 53/305; B60L 53/63; B60L 53/66; G06Q 50/06; H02J 13/00004; H02J 2310/12; H02J 3/32; H02J 3/322; H02J 7/35; Y02B 10/10; Y02B 90/20; Y02P 90/50; Y02E 10/56; Y02E 40/10; Y02E 60/00; Y02T 10/70; Y02T 10/7072; Y02T 10/72; Y02T 90/12; Y02T 90/14; Y02T 90/16; Y04S 10/126; Y04S 20/12; Y04S 40/121; G05B 15/02

See application file for complete search history.

(56) References Cited

U.S. PATENT DOCUMENTS

| | | | |
|---|---|---|---|
| 2011/0313964 A1* | 12/2011 | Sanchey Loureda ... | H02J 3/003 706/50 |
| 2014/0316600 A1* | 10/2014 | Jammer .................. | H02J 3/322 700/297 |
| 2014/0330695 A1* | 11/2014 | Steven ...................... | H02J 3/00 705/37 |
| 2022/0153162 A1* | 5/2022 | Choi ...................... | G06Q 10/02 |

* cited by examiner

*Primary Examiner* — Yuhui R Pan
(74) *Attorney, Agent, or Firm* — PatentPC PowerPatent; Bao Tran (57) ABSTRACT

System and methods are disclosed to charge an electric vehicle (EV) and manage grid power consumption. The system includes a building switchgear coupled to a building meter; an independent system operator (ISO) accepted meter coupled to the building switchgear, the ISO meter including a telemetry unit to communicate with an ISO; and a battery energy storage system (BESS) coupled to the building switchgear, and an ISO or System Performance Meter, wherein the BESS selectively provides power in response to a customer power demand or an EV charging request to prevent a customer grid power consumption from spiking and peaking at grid imbalance highest cost on peak times.

19 Claims, 7 Drawing Sheets

| | Costs | | Inception | | | Revenues Generated | | | | SAAS Expenses | | | | Cash Flows | |
|---|---|---|---|---|---|---|---|---|---|---|---|---|---|---|---|
| | CVP BESS Capex | EV Charging Capex | SGIP Rebate Initial | SGIP Rebate PBI | Depreciation Cash Value | Utility Bill Savings (UBS) | Revenue From EV (REV) | Revenue From Grid (RFG) | LESS: Energy Pay | LESS: Tenant UBS Savings | LESS: CVP Success Fee | LESS: Maintenance Fee | Net Income to Capacity Owner | Annual Cash Flow | Cumulative Cash Flow |
| Contract | $ 850,000.00 | $ 105,200.00 | $ 148,750.00 | | | | | | | | | | | $ (660,916.96) | $ (660,916.96) |
| Year 1 | | | | $ 29,750.00 | $ 33,850.53 | $ 12,119.24 | $ 127,742.70 | $ 3,316.11 | $ 33,405.00 | $ 1,967.31 | $ 18,373.23 | $ 5,500.00 | $ 81,932.51 | $ 158,022.71 | $ (502,894.25) |
| Year 2 | | | | $ 29,750.00 | $ 43,882.23 | $ 12,483.82 | $ 131,574.98 | $ 3,415.59 | $ 34,467.15 | $ 2,026.32 | $ 18,924.43 | $ 5,665.00 | $ 84,390.48 | $ 148,577.08 | $ (354,317.19) |
| Year 3 | | | | $ 29,750.00 | $ 31,904.88 | $ 12,857.30 | $ 135,522.23 | $ 3,518.06 | $ 37,561.16 | $ 2,087.11 | $ 19,492.16 | $ 5,834.95 | $ 86,922.20 | $ 142,634.59 | $ (211,682.59) |
| Year 4 | | | | $ 29,750.00 | $ 23,354.73 | $ 13,243.02 | $ 139,587.90 | $ 3,623.60 | $ 38,688.00 | $ 2,149.73 | $ 20,076.93 | $ 6,010.00 | $ 89,529.86 | $ 139,786.99 | $ (71,895.60) |
| Year 5 | | | | $ 29,750.00 | $ 17,821.23 | $ 13,640.31 | $ 143,775.53 | $ 3,732.31 | $ 39,848.64 | $ 2,214.22 | $ 20,679.23 | $ 6,190.30 | $ 92,215.76 | $ 112,863.46 | $ 40,907.86 |
| Year 6 | | | | | $ 17,821.23 | $ 14,049.52 | $ 148,088.80 | $ 3,844.27 | $ 41,044.10 | $ 2,280.65 | $ 21,299.61 | $ 6,376.01 | $ 94,982.23 | $ 115,652.93 | $ 156,560.79 |
| Year 7 | | | | | $ 7,956.18 | $ 14,471.00 | $ 152,531.46 | $ 3,959.60 | $ 42,275.42 | $ 2,348.07 | $ 21,938.60 | $ 6,567.29 | $ 97,831.70 | $ 108,716.83 | $ 265,277.62 |
| Year 8 | | | | | | $ 14,905.13 | $ 157,107.41 | $ 4,078.39 | $ 43,543.68 | $ 2,419.54 | $ 22,596.76 | $ 6,764.31 | $ 100,766.65 | $ 105,777.93 | $ 371,055.54 |
| Year 9 | | | | | $ 1,988.28 | $ 15,352.29 | $ 161,820.63 | $ 4,200.74 | $ 44,849.99 | $ 2,492.12 | $ 23,274.66 | $ 6,967.24 | $ 103,789.65 | $ 108,891.62 | $ 479,947.16 |
| Year 10 | | | | | $ 1,988.28 | $ 15,812.86 | $ 166,675.25 | $ 4,326.76 | $ 46,195.49 | $ 2,566.89 | $ 23,972.90 | $ 7,176.25 | $ 106,903.34 | $ (106,435.72) | $ 379,507.44 |
| Year 11 | $ 218,750.00 | | | | $ 8,199.94 | $ 16,287.24 | $ 171,675.51 | $ 4,456.57 | $ 47,581.36 | $ 2,643.89 | $ 24,692.09 | $ 7,391.54 | $ 110,110.44 | $ 124,195.28 | $ 503,702.72 |
| Year 12 | | | | | $ 10,781.53 | $ 16,775.86 | $ 176,825.77 | $ 4,590.26 | $ 49,008.80 | $ 2,723.21 | $ 25,432.85 | $ 7,613.29 | $ 113,413.75 | $ 124,515.29 | $ 628,218.01 |
| Year 13 | | | | | $ 7,699.13 | $ 17,279.14 | $ 182,130.55 | $ 4,727.97 | $ 50,479.06 | $ 2,804.91 | $ 26,195.84 | $ 7,841.68 | $ 116,816.16 | $ 125,819.37 | $ 754,037.37 |
| Year 14 | | | | | $ 5,496.72 | $ 17,797.51 | $ 187,594.46 | $ 4,869.81 | $ 51,993.44 | $ 2,889.05 | $ 26,981.71 | $ 8,076.94 | $ 120,320.65 | $ 128,004.92 | $ 882,042.30 |
| Year 15 | | | | | $ 4,074.66 | $ 18,331.44 | $ 193,222.30 | $ 5,015.91 | $ 53,553.24 | $ 2,975.73 | $ 27,791.16 | $ 8,319.24 | $ 123,930.27 | $ 131,722.83 | $ 1,013,765.13 |
| Year 16 | | | | | $ 4,074.66 | $ 18,881.38 | $ 199,018.96 | $ 5,166.38 | $ 55,159.84 | $ 3,065.00 | $ 28,624.90 | $ 8,568.82 | $ 127,648.17 | $ 135,552.28 | $ 1,149,317.40 |
| Year 17 | | | | | $ 4,074.66 | $ 19,447.82 | $ 204,989.53 | $ 5,321.38 | $ 56,814.63 | $ 3,156.95 | $ 29,483.64 | $ 8,825.89 | $ 131,477.62 | $ 136,956.26 | $ 1,286,273.66 |
| Year 18 | | | | | $ 1,534.31 | $ 20,031.25 | $ 211,139.22 | $ 5,481.02 | $ 58,519.07 | $ 3,251.66 | $ 30,368.15 | $ 9,090.66 | $ 135,421.95 | $ 139,484.61 | $ 1,425,758.27 |
| Year 19 | | | | | | $ 20,632.19 | $ 217,473.40 | $ 5,645.45 | $ 60,274.64 | $ 3,349.21 | $ 31,279.20 | $ 9,363.38 | $ 139,484.61 | $ 143,669.14 | $ 1,569,427.42 |
| Year 20 | | | | | | $ 21,251.16 | $ 223,997.60 | $ 5,814.81 | $ 62,082.88 | $ 3,449.68 | $ 32,217.57 | $ 9,644.28 | $ 143,669.14 | | |
| | $ 1,373,950.00 | | Total Incentives $ | 148,750.00 | $ 343,820.38 | | | | | | | Total Net Income | $ 2,081,557.23 | $ 1,569,427.42 | |

Metrics
IRR  18.17%
ROI  13.4%
Simple Payback  5+ years

FIG. 4

SYSTEMS AND METHODS FOR CHARGING ELECTRIC VEHICLES

The present invention relates to electric vehicle charging services.

BACKGROUND

The transportation sector contributes about 28% to U.S. carbon emissions. This sector must be decarbonized quickly to reduce emissions by 50% by 2030. This plan is based on electric vehicles (EVs) and in the next decade, the number of EVs driving on U.S. roads will increase dramatically. About 2% of the U.S. new car market was represented by EVs in 2020. The cumulative number of EVs on U.S. roads could be 35,000,000 by 2030.

On the other hand, it is a national concern how grid can properly supply energy to EV charging events which cause a considerable amount of peak demand. For example, DC Fast Charger causes approximately 150 KW of peak demand for approximately 20 minutes, and such peak size is almost equivalent to that of a normal 2-story office building. AC Level 2 Charger also causes approximately 50 kW of peak demand for several hours. Increasing numbers of EV's in the market will undoubtedly disturb the balance of grid. Thermal generator, known as a gas peaker, is one of the few dispatchable energy resources to mitigate such peak demand. 1 Megawatt of thermal generator generates approximately 6,500 metric tons of carbon dioxide. In other words, the efforts of decarbonizing a road with EV's can be ruined by creating more carbon dioxide on the grid.

For business and economy, the grid, including transformers, substations and transmission lines, will need to be upgraded as Level 2 and DCFC charging station consume large amounts. DCFC charging stations can consume the equivalent of a whole neighborhood's electricity. This makes it very expensive, particularly if during on-peak time charging. This is due in part to existing energy management applications that mainly perform user pattern analysis based on long-term data acquisition. Through this, the system is configured in such a way as to reduce utility power consumption. While the analysis over time is generally good at understanding consumer patterns, if a previously unknown/hidden pattern is discovered during actual operation, it can cause large financial losses such as on-peak time charging.

One of major obstacles for EV charging service providers (such as Tesla and Charge Point) is a risk of guarantee of minimum charging sessions (number of event per charging vehicle) against capital expenditure (CAPEX) of charging stations and battery storage system. In other words, if customers charge vehicles less than a certain times per day, investors in charging stations stand to lose the investment. Moreover, EV charging can cause an imbalance in the grid caused by electrification, and such imbalance is is mitigated using dispatchable energy resources like coal generators or gas peakers. In other words, EVs reduce use of gasoline for transportation but increases usage of polluting generators for grid supply.

SUMMARY

In one aspect, a system to charge an electric vehicle (EV) and manage grid power consumption, includes a building switchgear coupled to a building meter; an independent system operator (ISO) accepted meter coupled to the building switchgear, the ISO meter including a telemetry unit to communicate with an ISO; and a battery energy storage system (BESS) coupled to the building switchgear, and an ISO or System Performance Meter, wherein the BESS selectively provides power in response to a customer power demand or an EV charging request to prevent a customer grid power consumption from spiking and peaking at grid imbalance highest cost on peak times.

In another aspect, a method to charge an electric vehicle (EV) and manage grid power consumption in a system with a building switchgear coupled to a building meter; an independent system operator (ISO) accepted meter coupled to the building switchgear, the ISO meter including a telemetry unit to communicate with an ISO; and a battery energy storage system (BESS) coupled to the building switchgear, and an ISO or System Performance Meter, the method including selectively providing power from the BESS in response to a customer power demand or an EV charging request to prevent a customer grid power consumption from spiking and peaking at grid imbalance highest cost on peak times.

Implementations of the above aspects may include one or more of the following:
optimizing building energy resources during non-EV charging times;
intercepting events between the EV Charger and EV that occur including unmated, mated, initialize, cable check, precharge, charge, and power down;
capturing the communication between EV charger and EV vehicle on requested charging power;
communicating with the EMS to determine the status of the BESS and prepare the BESS a predetermined amount of power for discharging, considering battery capacity;
when the BESS is ready, sending a signal to the EMS-EV, and the EMS-EV opens a channel for direct communication between EV charger and EV;
performing EV charging through BESS discharging; and
when a power-down event is detected, stopping BESS discharging through EMS-EV and EMS.

Advantages of the system may include one or more of the following. The system provides Concurrence Control where the energy management system controls to save electricity of building under interfacing with Grid (ISO Metering) and Time-of Use, and to spontaneously dispatch energy from BESS upon EV charging event so that EV charging does not impact on disturbing grid balance. The system addresses the national concern that a dramatic increase of EVs will cause dramatic increase of demand peak resulted in deepening of imbalance of grid. The system reduces greenhouse gas (GHG). Dispatchability of energy resources is critical to mitigate peak demand in the grid. For example, renewable energy such as solar PV and wind is intermittent but cannot deliver the energy on time and on right peak demand. Thermal energy known as Gas Peaker and Battery Energy Storage are two best dispatchable resources. Gas Peaker reacts in tens of seconds and battery energy storage reacts in milliseconds.

For Building:
Utilities, specially in California, delivers thermal energy resources at peak hours, 4 pm-9 pm, in order to mitigate high peak demand known as "Duck Curve." This innovation reads 1-second metering data to dispatch the most optimum energy from CVP bank to building, enabling not to use grid power during this peak hours. Each 1 MW of CVP recognizes 1,300 metric tons of $CO_2$ reduction annually.

For EV Charging
With a global target of 2025 and 2030, dramatic increase of EV will be seen in the market. DCFC causes approximately 150 KW of peak demand for about 20-30 minutes and disturb grid balancing. CVP will dispatch its energy simultaneously when charging session takes a place, enabling not to use grid power and to mitigate peak demand generated by EV Charging.

The system enables safe investment of EV chargers and Battery Energy Storage System.

This innovation enables business to provide both EV charging solution and Lowering Bill solution together. Lowering bill by reducing peak demand has definitive consequences of GHG reductions.

For investing EV Charging stations, one of the major risks is how often invested charging events would occur ("Session" Time). This investment risk will be even more severe if BESS investment is added on top of that of EV Charging stations.

CVP-EV innovation uses BESS as a "battery bank" whose energy is shared between building load reduction and EV charging. This means that the invested BESS will reserve 100% system utilization whose energy sales revenue can establish a reasonable internal rate of return for the upfront capital expenditure (CAPEX) for both BESS and EV chargers.

BRIEF DESCRIPTION OF THE DRAWINGS

FIG. 4 shows exemplary analysis of payoffs for a CVP-EV investment.

DETAILED DESCRIPTION

Figure 1A:
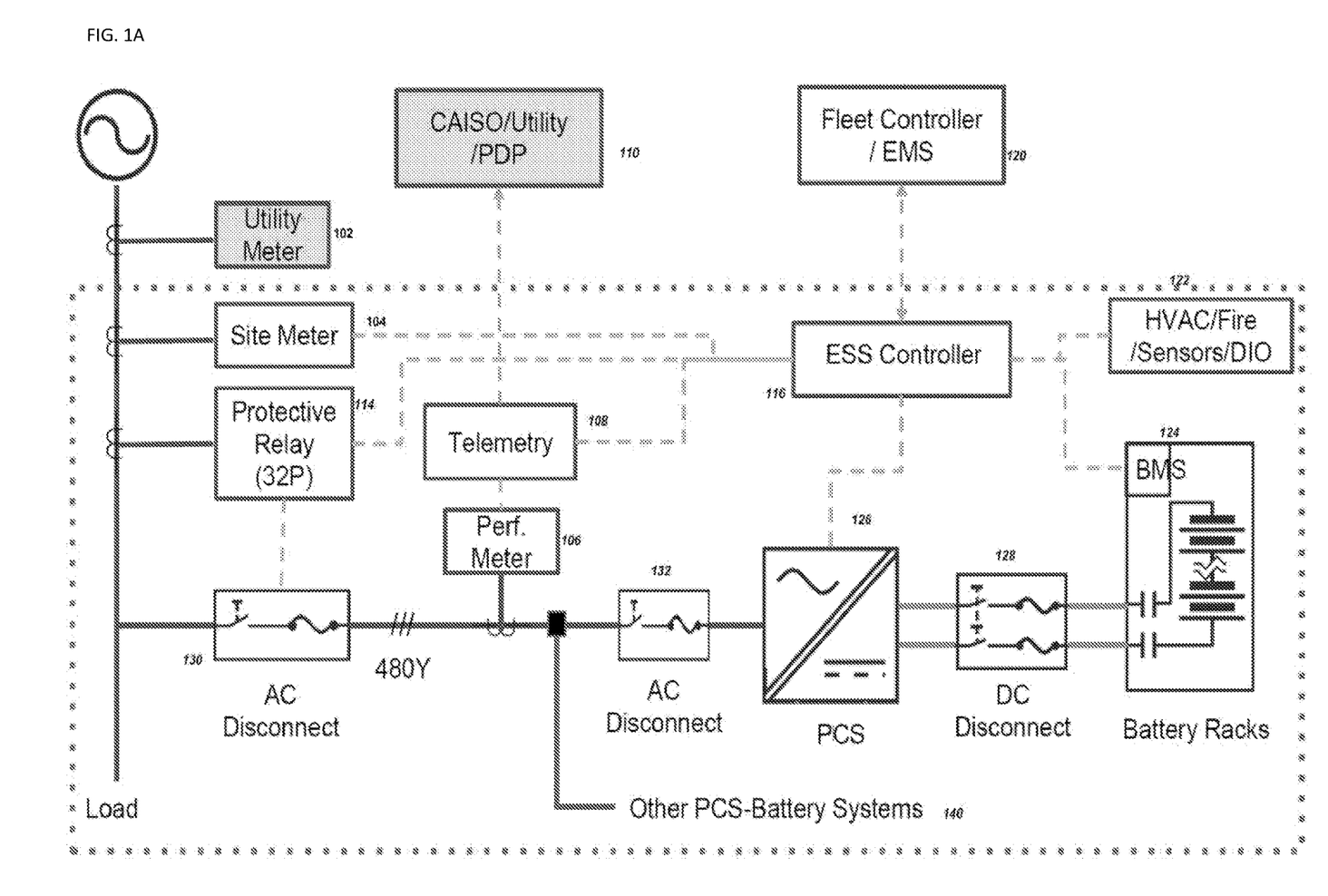
FIG. 1A shows an exemplary Clean Virtual Power system that reduces surge pricing and buffers EV loads.

FIG. 1A shows an exemplary Clean Virtual Power (CVP) EV system available from Micronoc Incorporated. In this system, power is supplied by the grid and consumed by one or more loads, including EVs. The CVP EV system provides concurrent control of peak usage that handles EV charging and building loads. The system can handle Level 1-3 charging.

Building peak electricity cost is most expensive at Peak Hours (typically 4 PM-9 PM) as pre-arranged by the utility and ISO authority, while EV charging event is random and driven by EV user's behaviors that poses an unknown load that can overwhelm grid resources from the views of energy suppliers (utility and ISO). Using a CVP battery bank as an energy source, the battery bank can accurately dispatch energy for congested time of grid (Peak hours) for building and for EV charging events. This will dramatically help to reduce peak and reserved power to prepare for the random event of EV charging, and release congestion of evening peak hours.

Such consumption is measured by a utility meter 102 and a site meter 104, and a performance meter 106. Data captured by meter 106 is provided to a telemetry unit 108 that provides to an ISO/utility authorized communication protocol 110. The output of telemetry unit 108, along with the site meter 104, is provided to an energy storage system (ESS) controller 116. The controller 116 also receives line quality data as captured through protective relays 114. The controller 116 also controls HVAC systems, fire alarms, alert signal systems, and/or suppression systems, sensors, and input/output devices 122. The controller 116 also controls a battery system 124 with a battery management system and a plurality of battery racks. The controller 116 can control the charging of the battery system 124 using a power conversion system 126, which has a DC disconnect 128 for safe disconnect from the battery system 124. Similarly, an AC disconnect 130 is positioned between grid power and a second AC disconnect 132 before power goes into the PCS 126. Additionally, other PCS systems or battery systems 140 can be connected to the output of the AC disconnect 130.

The ESS 116 selectively provides power in response to a customer power demand and energy usage behavior to prevent a customer grid power consumption from high spiking peaks during the grids most unstable or imbalanced high-cost times. For the majority of AERS™ QBR operation, the customer's power consumption is well within the utility and grid operations baseload supply thus keeping the electric bill at the lowest cost possible. During the off-peak hours usually the baseload's low-cost rate period, the ESS is charged or energized from the grid power some or all of energy needed depending on QBR ESS or ESS+alternative power generation system installed on site. The increase of site loads off peak cost hours are minimal if any because discharging hours of QBR ESS for high cost on peak hours are mainly 6 hours or less accumulated in a 24-hour period and the lowest cost hours for charging can be spread through efficiently through a spread of the rest of 18 hours.

As the ESS 116 only kicks in on a minority of the time, the ESS 116 contains power that can be tapped into to correct grid disturbances. This ability is enhanced when aggregation of ESS 116 connected at C&I main electric switchgears that can be controlled by a network operations center (NOC) to collectively supply power into the grid by discharging for reduction of load from grid or by charging to increase load consumption when grid is over energized to address a power imbalance that can lead to brown-outs. When such collection of ESSes provide power to the grid, they can be compensated by the utility or ISO. The utility wins because it can avoid spending billions on a new powerplant, and the ESS/NOC wins with extra revenue from being a virtual power plant that can inject or reduce power for a selected period in response to a request from an ISO or a utility. Thus, the meters need to be ISO allowable and/or revenue grade meters.

In the system of FIG. 1A, the utility meter and the ISO meter are revenue grade meters that conform to specifications by the utility and the ISO. Meter data represents the energy generated or consumed during a settlement interval. The ISO, ISO metered entities, and scheduling coordinator (SC) metered entities follow prescribed processes and procedures to ensure the data is settlement quality. The ISO meter performs accurate metering of electricity generated or consumed provides key data inputs for accurate settlement calculations. Direct measurement of a generator or load participant through telemetry allows the ISO or the utility to manage and monitor power generation in real-time. The specification of the meter is highly controlled, as the ISO and utility bill based on the meter output.

In one embodiment, CAISO Metered Entities ensure that the Meter Data obtained by the CAISO directly from their revenue quality meters is raw, unedited and un-aggregated Meter Data in kWh values. The CAISO or SC will be responsible for the Validation, Estimation, and Editing process of that Meter Data in order to produce Settlement Quality Meter Data.

The system of FIG. 1A conforms to utility and ISO specifications, as the ISO controls the local utilities to ensure orderly operation for electricity supply in a region. For example, the California Independent System Operator (CAISO) is a non-profit Independent System Operator (ISO) serving California and oversees the operation of California's bulk electric power system, transmission lines, and electricity market generated and transmitted by its member utilities. By providing a separate compliant meter for the ISO, the system can now participate direct to the ISO to help facilitate local utility's reliability and CAISO's grid balancing of energy supply and demand. Each QBR resource are registered with CAISO SC resource ID and AERS™ Point of Control/Trade (POC/POT) ID that are synchronized with utility rate tariff, system load meter data, and CAISO Lap Points and pNodes.

In one embodiment, a meter and a NOC network controller are connected to a power management system (PMS). The PMS in turn is connected to each of the aggregated ESS management system that are connected a remote on site NOC controller. Each BMS/PCS combination is tied to manual stop button or disconnect switches and circuit breakers on site to ensure safety and security of onsite system. Also, to ensure proper metering telemetry and the safety of physical electricity connection, the QBR system it is protected using protective relays approved by utilities. In turn each of the QBR POC satisfies the minimum requirement of California Public Utilities Commission Electrical Interconnection Tariff Rule 21.

The charging and discharging scheduling method for ESS in FIG. 1 under time-of-use price applied in one embodiment, accesses the ESS as part of electricity grid device to safely and efficiently deliver electricity to and from buildings, that plays a role of load shifting, improves the safety and stability of the power and energy usage operation under time-of-use price, and meanwhile increases the efficiency of energy utilization and the economy of the transmission and distribution grid and load usage operation, that can truly make building-to-grid (B2G) feasible and controllable building demand into grid assets.

The charging and discharging scheduling method for the system of FIG. 1 under time-of-use price applied in one embodiment, incorporates not only the ESS, but also the photovoltaic unit, and other power sources such as gas generator, into the optimal scheduling model of B2G, which consummates the optimal scheduling model considering only the ESS.

The system of FIG. 1A consists of interconnection control devices, energy management and energy storage system with optional solar PV. CVP-EV contains a highly sophisticated software operating system which governs EV chargers and energy storage system in order to optimize its operation profile and to mitigate demand peaks of both building and EV chargers for the best economy benefits.

Figure 1B:
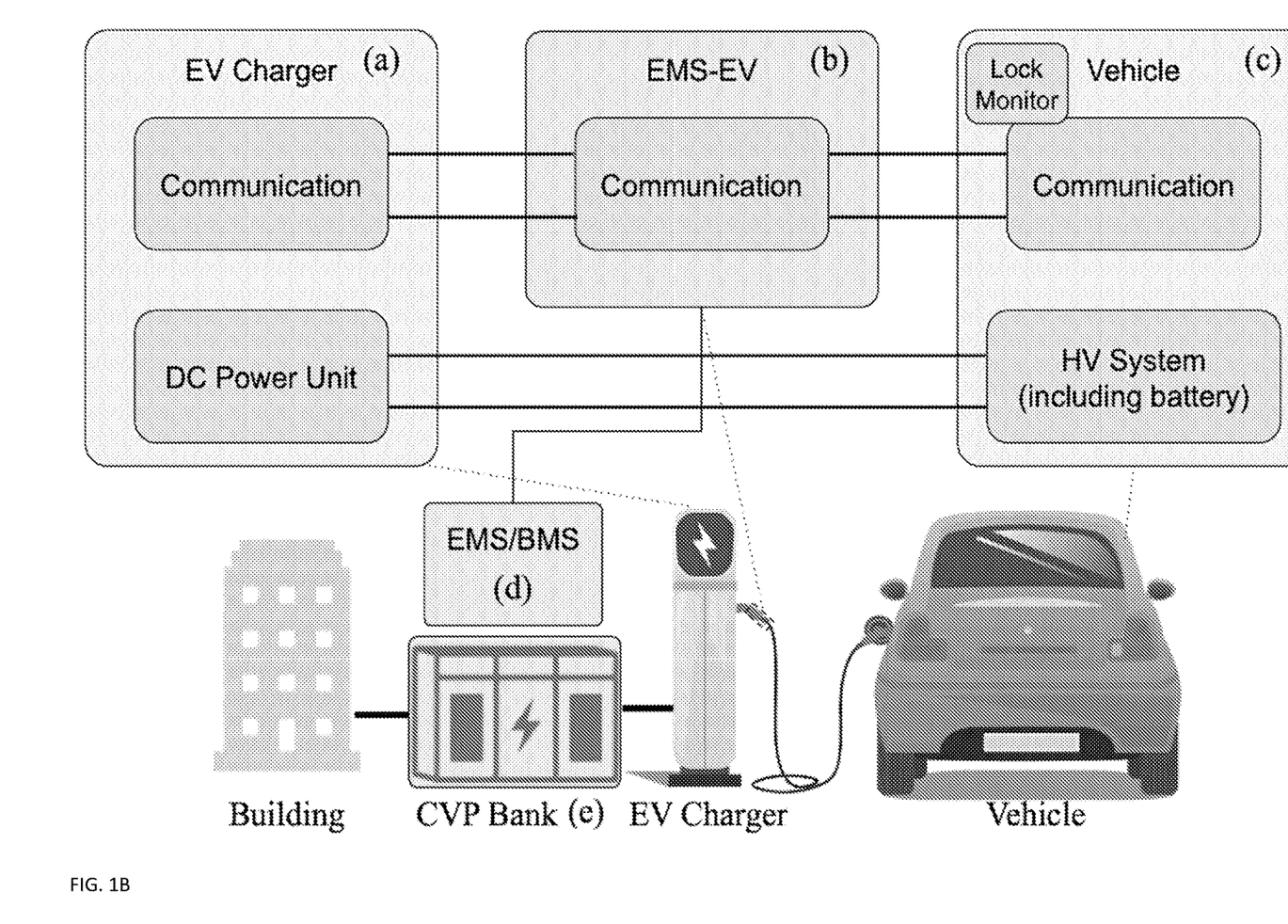
FIG. 1B shows an overview diagram where an existing EV charger EV charger (a) and vehicle (b) expanded to support both shaving peak of the building and EV charging.

FIG. 1B shows an overview diagram where an existing EV charger EV charger (a) and vehicle (b) expanded to support both shaving peak of the building and EV charging. The EV chargers have a vehicle database and perform charging while communicating with the vehicle in real time. For an energy management system (EMS) to intervene in this process, an intermediate device is provided that intervenes between the EV Charger and the vehicle. In FIG. 1B, the existing configuration of EV charging includes (EV charger (a) and EV vehicle (c)) while parts ((b), (d), and (e)) represents the expanded components.

In FIG. 1B, the EV charger EV charger (a) includes a communication module and a DC power unit. The EV communication module transfers data with an EMS EV (b) communication module, which in turn communicates with a communication module in an electric vehicle (c). The vehicle (c) also has access lock monitor and a high voltage charging system that receives DC power from the DC power unit. The EMS-EV communicates with an EMS/BMS (d) that controls the CVP bank (e) which buffers peak energy consumption by a building or EV charging using the EV charger connected to an EV.

This system has the following operating scenario.
1. During non-EV charging times, i.e., not all EV chargers are mated, EMS optimizes the building's resources.
2. EMS-EV intercepts all events of EV Charger and EV that occur such as unmated, mated, initialize, cable check, precharge, charge, and power down.
3. Capture the communication between EV charger (a) and EV vehicle (c) to find out how much power is needed.
4. EMS-EV communicates with the EMS (d) to determine the status of the CVP Bank (e) and prepares the given amount of power for discharging, considering CVP capacity.
5. The precharge and charge to send to EV vehicle (c) wait until the Battery Energy Storage Systems (BESS) is ready.
6. When the BESS is ready, the EMS sends a signal to the EMS-EV, and the EMS-EV opens a channel for direct communication between EV charger (a) and EV vehicle (c).
7. EV charging through CVP Bank (e) discharging proceeds.
8. When a power-down event is detected, BESS discharging is stopped through EMS-EV and EMS.

Figure 1C:
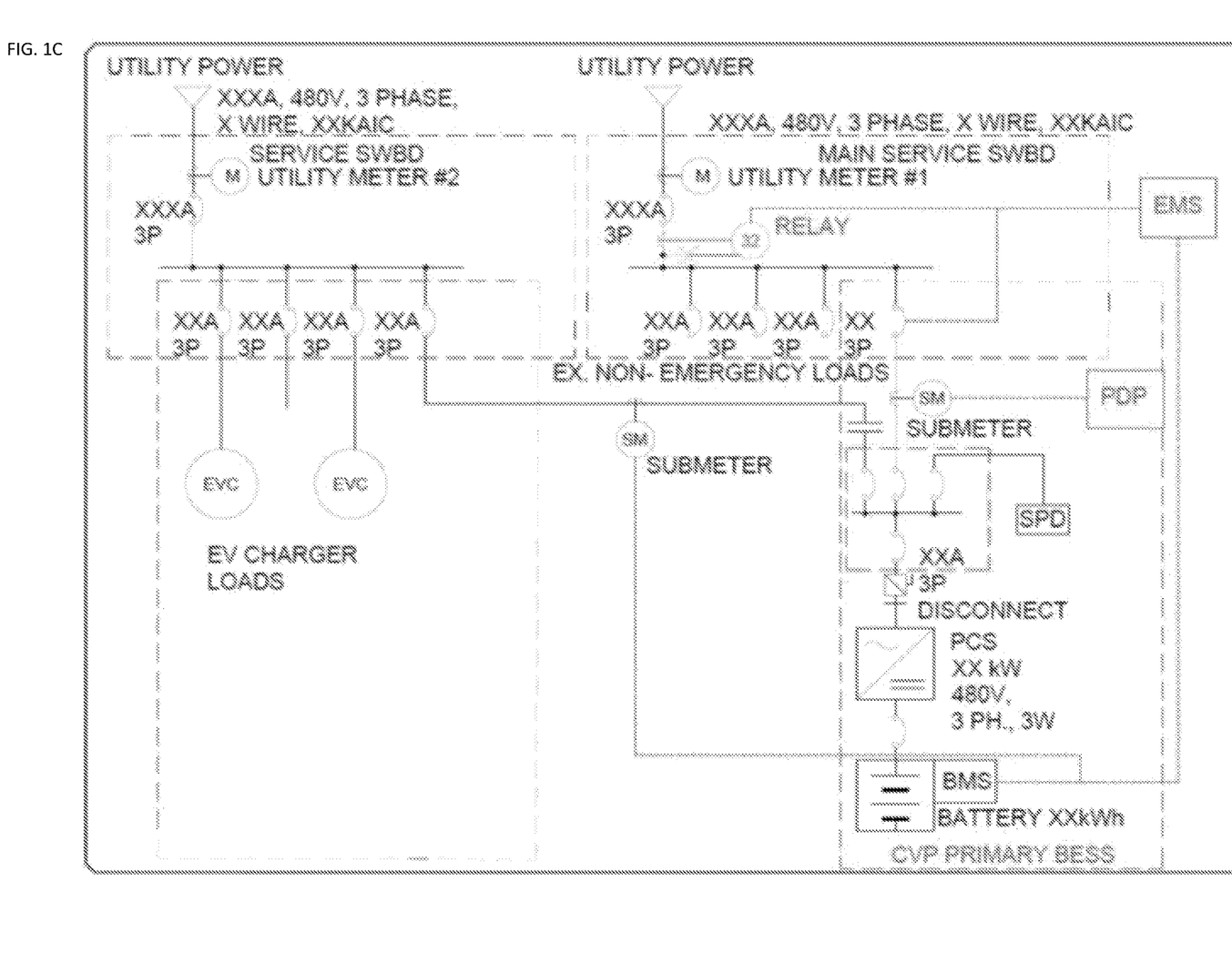
FIG. 1C shows an exemplary circuit diagram that prevents reverse flow, that is, EMS that performs adaptive discharging and RELAY that prevents the reverse flow secondarily.

FIG. 1C shows an exemplary circuit diagram that prevents reverse flow, that is, EMS that performs adaptive discharging and RELAY that prevents the reverse flow secondarily.

Figure 1D:
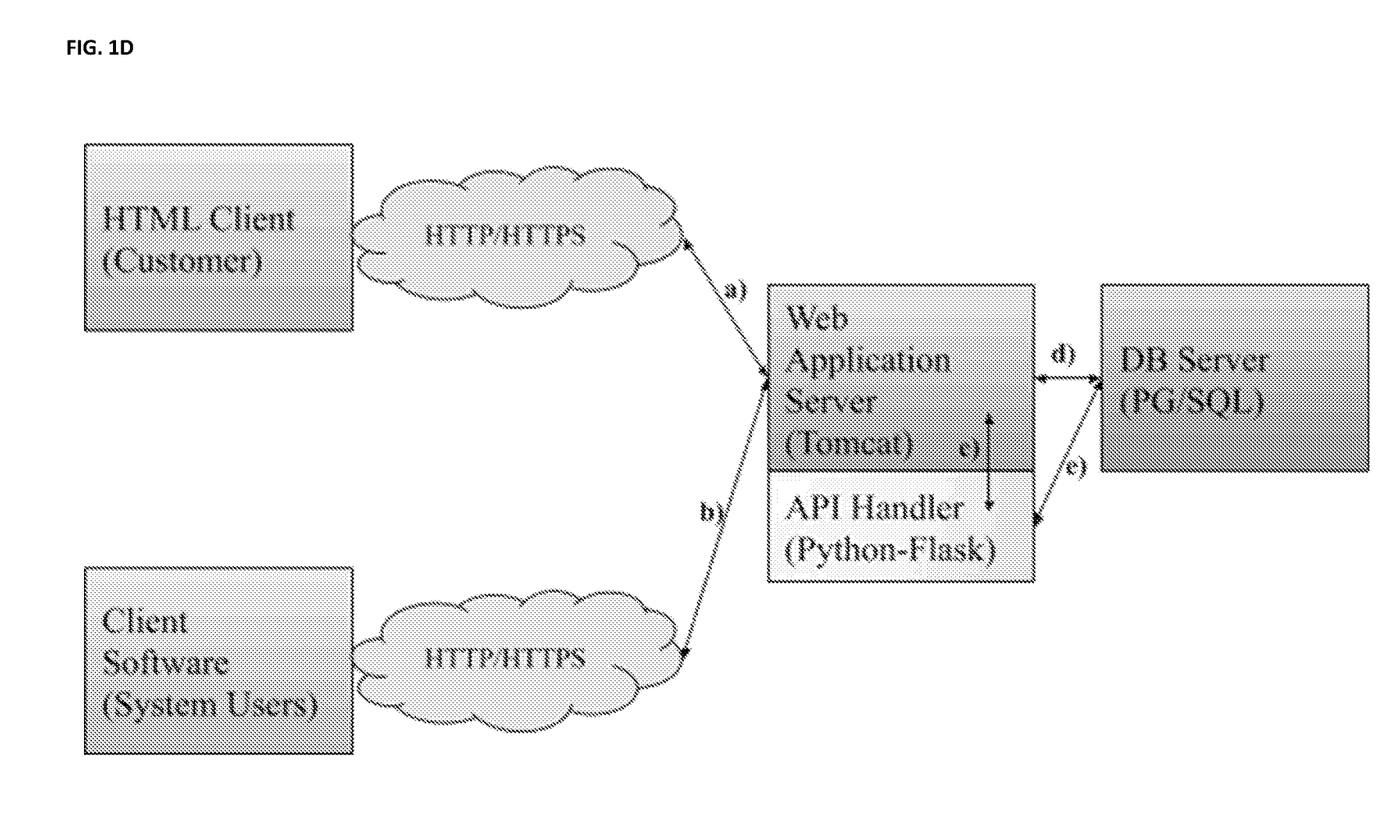
FIG. 1D shows an exemplary cloud-system to control the CVP of FIG. 1A.

FIG. 1D shows an exemplary cloud-system to control the CVP of FIG. 1A. The system includes web/html clients that communicate over http channels to an application server with an Application Program Interface (API). The server and API handler communicates with a database server that responds with data upon request. In some embodiments, the system of FIG. 1D may be implemented as a cloud-based computing environment, such as a virtual machine operating within a computing cloud. In other embodiments, the computer system may itself include a cloud-based computing environment, where the functionalities of the computer system are executed in a distributed fashion. Thus, the computer system, when configured as a computing cloud, may include pluralities of computing devices in various forms, as will be described in greater detail below. In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources. The cloud may be formed, for example, by a network of web servers that comprise a plurality of computing devices, such as the computer system, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Figure 2:
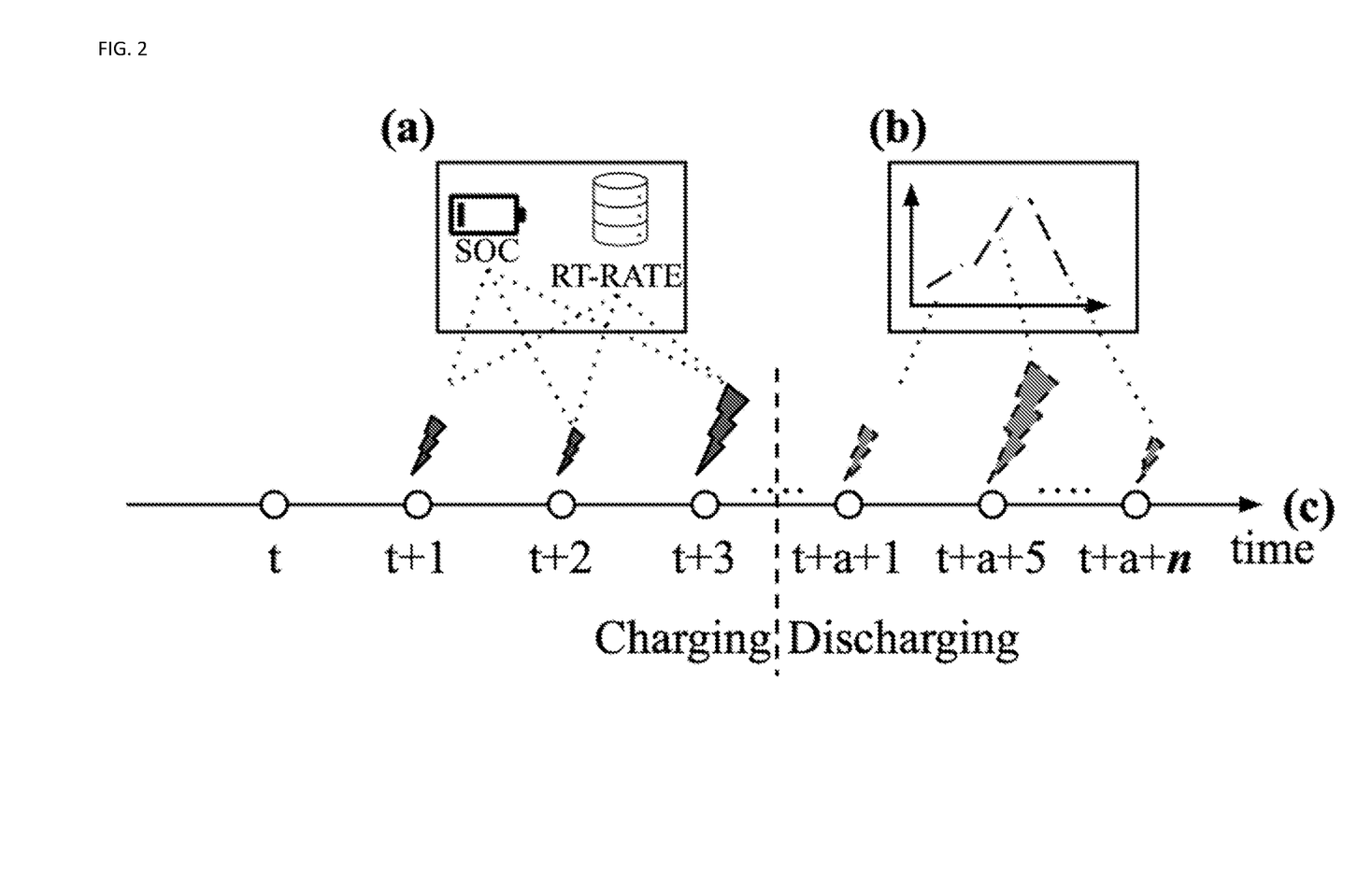
FIG. 2 shows an overview of adaptive charging/discharging over time.

FIG. 1C shows an exemplary circuit diagram that prevents reverse flow, that is, EMS that performs adaptive discharging and RELAY that prevents the reverse flow secondarily while FIG. 2 shows an overview of adaptive charging/discharging over time.

In the example of FIG. 2, from time t to t+3, the system is charging the battery, and from time t+a+1 forward, the system discharges energy from the battery to the grid. The system is an Operating System of Energy Management by Integrating Adaptive Energy Operation for Building and EV Charging at the same time. Exemplary operations of the system are as follows:

a. Energy Management System Software (AERS™) use 1 second interval data analysis to determine exact amount of dispatching energy
   i. Therefore, it is necessary to predict power consumption/power required for charging for the next t+w by reading the power usage in real time at the current time t where its window size is w as shown in FIG. 2A, also known as Adaptive Operation Profile (AOP) which achieves the following goals:
      1. The AOP precisely controls resource delivery for best results to lower utility rates at commercial and industrial building sites during peak hours.
      2. The resource also contributes to grid balancing by supplying demand response resources to the grid wholesale market in accordance with FERC Order 2222 by reading ISO certified meters in a 1-second AOP.
      3. Charging that considers the current state of charge (SOC) and real-time utility rate (RT-RATE) together lowers the load on the battery and reduces costs.
      4. The AOP also prevents resources from creating reverse flow into the grid distribution lines. The AOP works in conjunction with the protective relay configuration circuit diagram, one example is shown in FIG. 1C.
b. AERS simultaneously interface with EV charger's protocol to dispatch energy from CVP Bank, preventing from using Grid power at peak hours
   i. Goal to achieve concurrency control between building load reduction and peaks generated by EV charging events is to achieve the best economy for the users, utility and grid operator.
   ii. Existing EV chargers have a vehicle database and perform charging while communicating with the vehicle in real time. For EMS to intervene in this process, we have an intermediate device and intervene between the EV Charger and the vehicle and shows an overview diagram showing how the existing EV charger and vehicle expanded. In the figure, the gray part represents the existing configuration of EV charging (EV charger (a) and EV vehicle (c)) and the EMS-EV (b), EMS/BMS (d), and CVP bank (e) represent the expanded components.
   iii. This system has the following scenario.
      1. During non-EV charging times, i.e., not all EV chargers are mated, EMS optimizes the building's resources.
      2. EMS-EV intercepts all events of EV Charger and EV that occur such as unmated, mated, initialize, cable check, precharge, charge, and power down.
      3. Capture the communication between EV charger (a) and EV vehicle (c) to find out how much power is needed.
      4. EMS-EV communicates with the EMS (d) to determine the status of the CVP Bank (e) and prepares the given amount of power for discharging, considering CVP capacity.
      5. the precharge and charge to send to EV vehicle (c) wait until the BESS is ready.
      6. When the BESS is ready, the EMS sends a signal to the EMS-EV, and the EMS-EV opens a channel for direct communication between EV charger (a) and EV vehicle (c).
      7. EV charging through CVP Bank (e) discharging proceeds.
      8. When a power-down event is detected, BESS discharging is stopped through EMS-EV and EMS.

Greenhouse Gas (GHG) Reduction is reduced. The dispatchability of energy resources is critical to mitigate peak demand in the grid. For example, renewable energy such as solar PV and wind is intermittent but cannot deliver the energy on time and on right peak demand. Thermal energy from Gas Peakers and Battery Energy Storages are two best dispatchable resources. The difference is that Gas Peaker reacts in tens of seconds while battery energy storage reacts in milliseconds.

For Building:
   Utilities, specially in California, delivers thermal energy resources at peak hours, 4 pm-9 pm, in order to mitigate high peak demand known as "Duck Curve." This innovation reads 1-second metering data to dispatch the most optimum energy from CVP bank to building, enabling not to use grid power during these peak hours. Each 1 MW of CVP recognizes 1,300 metric tons of $CO_2$ reduction annually.

For EV Charging
   With a global target of 2025 and 2030, dramatic increase of EV will be seen in the market. DCFC causes approximately 150 kW of peak demand for about 20-30 minutes and disturb grid balancing. CVP will dispatch its energy simultaneously when charging session takes a place, enabling not to use grid power and to mitigate peak demand generated by EV Charging.

Figure 3:
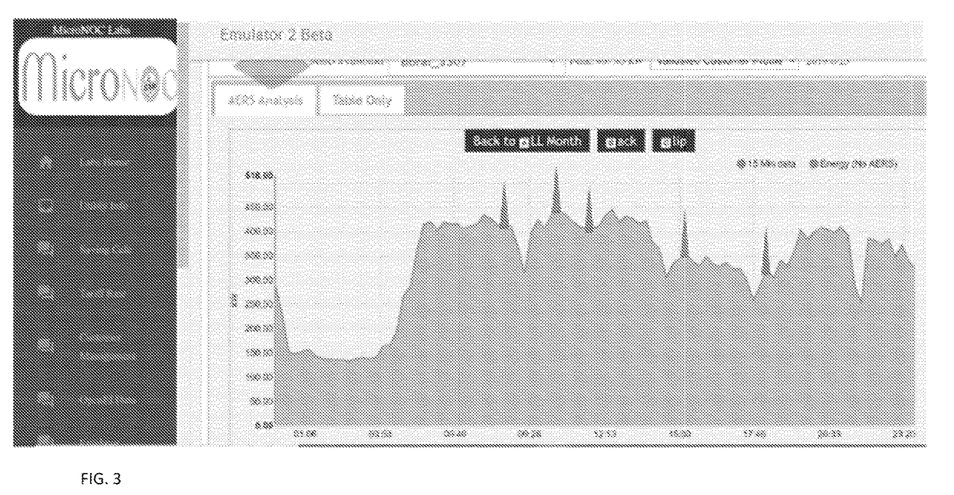
FIG. 3 shows exemplary operating curves.

For example, FIG. 3 shows how CVP-EV works for approximately 500 kW-demand building using several times of EV charging. One DC Fast Charger (DCFC) generates approximately 150 kW of demand peak for approximately 30 minutes where an average office building consumes about 50 kW. CVP-EV will enable customers to remove peaks caused by EV charging sessions and to reduce demand and energy of building at Peak Hours (4 pm-9 pm).

One of the major concerns of investing CVP (battery bank) and EV Chargers as a Service business model is to retain a guarantee of session times (how often customer pumps chargers) while no one can guarantee the session.

CVP-EV can mitigate investment risk against the number of sessions. In CVP-EV, CVP serves during 4 PM-9 PM load reduction as a base utilization of the invested system while CVP Bank spares energy to dispatch to EV Charger when a session event happens. Software interface of Micronoc Energy Management System (EMS or AERS™) with EV charging software will precisely control energy delivery from CVP Bank to EV Charging Station.

FIG. 4 shows exemplary analysis of payoffs for a CVP-EV investment. For a capital expenditure (CAPEX) of $1.173M and government incentives of $542K, a deployment of the current system would provide a net income of $2.2M, cashflow of $1.57M with an IRR of 18% and ROI of 134% and payback of about five years. Thus, the system supports safe investment of EV chargers and Battery Energy Storage System. The system enables business to provide both EV charging solution and Lowering Bill solution together. Lowering bill by reducing peak demand has definitive consequences of GHG reductions. For investing EV Charging stations, one of the major risks is how often invested charging events would occur ("Session" Time). This investment risk will be even more severe if BESS investment is added on top of that of EV Charging stations. The CVP-EV innovation uses BESS as a "battery bank" whose energy is shared between building load reduction and EV charging. This means that the invested BESS will reserve 100% system utilization whose energy sales revenue can establish a reasonable internal rate of return for the upfront capital expenditure (CAPEX) for both BESS and EV chargers.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including but not limited to wireless, wireline, optical fiber cable, RF, etc., or any suitable combination of the foregoing.

What is claimed is:

1. A system to charge an electric vehicle (EV) and manage grid power consumption, comprising:
   a building switchgear coupled to a building meter;
   an independent system operator (ISO) accepted meter coupled to the building switchgear, the ISO accepted meter including a telemetry unit to communicate with an ISO;
   a battery energy storage system (BESS) coupled to the building switchgear,
   the BESS is coupled to an ISO or System Performance Meter, wherein the ISO or System Performance Meter is separate from the ISO accepted meter, and wherein the BESS selectively provides power in response to a customer power demand or an EV charging request to prevent a customer grid power consumption from spiking and peaking at grid imbalance highest cost on peak times,
   code to:
   intercept events between the EV Charger and EV that occur including unmated, mated, initialize, cable check, precharge, charge, and power down; and
   communicate with the EMS to determine the status of the BESS and prepare the BESS a predetermined amount of power for discharging, considering battery capacity.

2. The system of claim 1, comprising code to determine an Adaptive Operation Profile (AOP) that controls resource delivery to reduce utility rates at commercial and industrial building sites during peak.

3. The system of claim 1, comprising a building management system (BMS) coupled to the BESS.

4. The system of claim 3, comprising an EV charger coupled to the BESS to charge the EV.

5. The system of claim 4, wherein the EV charger considers a state of charge (SOC) and real-time utility rate (RT-RATE) together to reduce battery load and costs.

6. The system of claim 3, comprising an energy management system (EMS) coupled to the BMS.

7. The system of claim 6, comprising an EV charger with an EV charger communication unit is coupled to an EMS communication unit.

8. The system of claim 7, comprising an EV communication unit coupled to the EMS communication unit and to a vehicle controller to charge a high voltage system in the EV.

9. The system of claim 7, comprising an energy management system (EMS) communication unit coupled to the EV charger communication unit.

10. The system of claim 7, wherein the EV comprises code to:
    optimize building energy resources during non-EV charging times;
    when the BESS is ready, send a signal to the EMS-EV, and the EMS-EV opens a channel for direct communication between EV charger and EV;
    perform EV charging through BESS discharging; and when a power down event is detected, stop BESS discharging through EV and EMS.

11. The system of claim 1, comprising code to profile Customer Electricity Usage, and code to determine electricity cost savings.

12. The system of claim 11, comprising code to optimize resource capacity.

13. The system of claim 12, wherein the resource capacity includes power from one or more batteries and one or more solar panels.

14. The system of claim 1, comprising code to determine a consumption behavior over a period of time to identify a Demand and Energy Peak Usage Pattern and Patterns during ON PEAK hours under Utility Tariffs.

15. The system of claim 1, comprising code to find a highest peak (kW) during ON PEAK hours.

16. The system of claim 1, comprising code to find a lowest peak (KW) during ON PEAK hours.

17. The system of claim 1, comprising a plurality of photovoltaic (PV) modules coupled to the BESS, wherein the plurality of PV modules are connected to one or more PV combiners, further comprising a DC-DC converter coupled to the PV combiners, further comprising a plurality of battery combiners coupled to the DC-DC converter.

18. A method to charge an electric vehicle (EV) and manage grid power consumption in a system with a building switchgear coupled to a building meter; an independent system operator (ISO) accepted meter coupled to the building switchgear, the ISO accepted meter including a telemetry unit to communicate with an ISO; and a battery energy storage system (BESS) coupled to the building switchgear, and an ISO or System Performance Meter, the method including
selectively providing power from the BESS in response to a customer power demand or an EV charging request to prevent a customer grid power consumption from spiking and peaking at grid imbalance highest cost on peak times;
intercepting events between the EV Charger and EV that occur including unmated, mated, initialize, cable check, precharge, charge, and power down; and
communicating with the EMS to determine the status of the BESS and prepare the BESS a predetermined amount of power for discharging, considering battery capacity.

19. A method to charge an electric vehicle (EV) and manage grid power consumption in a system with a building switchgear coupled to a meter; an independent system operator (ISO) accepted meter coupled to the building switchgear, the ISO accepted meter including a telemetry unit to communicate with an ISO; and a battery energy storage system (BESS) coupled to the building switchgear, the BESS including a second meter communicating with the ISO, comprising:
optimizing building energy resources during non-EV charging times;
intercepting events between the EV Charger and EV that occur including unmated, mated, initialize, cable check, precharge, charge, and power down;
capturing the communication between EV charger and EV vehicle on requested charging power;
communicating with the EMS to determine the status of the BESS and prepare the BESS a predetermined amount of power for discharging, considering battery capacity;
when the BESS is ready, sending a signal to the EV, and the EV opens a channel for direct communication between EV charger and EV;
performing EV charging through BESS discharging; and
when a power down event is detected, stopping BESS discharging through EV and EMS.

* * * * *